United States Patent
Yu et al.

(10) Patent No.: US 10,073,181 B2
(45) Date of Patent: Sep. 11, 2018

(54) INTERACTIVE EVENT GROUPING METHOD

(71) Applicant: Schlumberger Technology Corporation, Sugar Land, TX (US)

(72) Inventors: Xin Yu, Houston, TX (US); James T. Rutledge, Santa Fe, NM (US); Walter Scott Leaney, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/922,190

(22) Filed: Oct. 25, 2015

(65) Prior Publication Data

US 2016/0116617 A1    Apr. 28, 2016

Related U.S. Application Data

(60) Provisional application No. 62/067,992, filed on Oct. 24, 2014.

(51) Int. Cl.
*G01V 1/40* (2006.01)
*G01V 1/28* (2006.01)
*G01V 1/30* (2006.01)

(52) U.S. Cl.
CPC ........ *G01V 1/288* (2013.01); *G01V 2210/123* (2013.01); *G01V 2210/1234* (2013.01); *G01V 2210/642* (2013.01); *G01V 2210/646* (2013.01)

(58) Field of Classification Search
CPC ............. G01V 1/288; G01V 2210/123; G01V 2210/646; G01V 2210/642; G01V 2210/1234
USPC ......................................... 367/26, 75, 25, 28
See application file for complete search history.

(56) References Cited

U.S. PATENT DOCUMENTS 9,465,123 B2 * 10/2016 Lin ........................ G01V 1/288

OTHER PUBLICATIONS

I.V. Rodriguez, et al, "Resolution of Seismic-Moment Tensor Inversions from a Single Array of Receivers," Bulletin of the Seismological Society of America, vol. 101, No. 6, pp. 2634-2642, Dec. 2011.
V. Vavrycuk, "On the retrieval of moment tensors from borehole data," Geophysical Prospecting, 2007, vol. 55, pp. 381-391.

* cited by examiner

*Primary Examiner* — Daniel L Murphy
(74) *Attorney, Agent, or Firm* — Sara K.M. Hinkley

(57) ABSTRACT

A technique facilitates enhanced microseismic monitoring. The technique may be applied to source mechanism identification under, for example, ill-conditioned receiver coverage to enhance the resolvability for microseismic monitoring. The microseismic monitoring may be used in hydraulic fracturing monitoring, induced seismicity monitoring, CO2 injection monitoring, other injection monitoring, mining, and/or other techniques which cause microseismic events.

19 Claims, 5 Drawing Sheets

Composite FPS2 plot

Composite FPS2 plot in cylindrical coordinates

Slip + Opening

Tilted slipping (-E) + (+O) + slip

Locations and beach ball of the synthetic data

Locations and fault plane solutions of the synthetic data

Locations and Hockey-Puck display of the synthetic data

INTERACTIVE EVENT GROUPING METHOD

CROSS-REFERENCE TO RELATED APPLICATIONS

The present document is based on and claims priority to U.S. Provisional Application Ser. No. 62/067,992, titled "AN INTERACTIVE EVENT GROUPING METHOD", to Xisn Y U et. al., filed Oct. 24, 2014, which is incorporated herein by reference in its entirety.

BACKGROUND

Subterranean exploration and evaluation has produced a variety of methods and techniques useful to scientific and commercial interest. Analyzing microseismic signals produced during the fracturing or movement of geological features and layers can provide a three-dimensional indication of the activity and surrounding composition of a region of interest. The analysis of microseismic signals can be used to facilitate the detection and production of hydrocarbon fluids. Hydrocarbon fluids such as oil and natural gas are obtained from a subterranean geologic formation, referred to as a reservoir, by drilling a well that penetrates the hydrocarbon-bearing formation. Hydraulic fracturing of the subterranean geologic formation can increase the production and effectiveness of a reservoir. Monitoring microseismic signals produced during hydraulic fracturing can aid well operators in determining the extent and direction of the produced fractures.

SUMMARY

In general, a methodology and system are described for providing enhanced microseismic monitoring. The system and methodology may be applied to source mechanism identification under, for example, ill-conditioned receiver coverage to enhance the resolvability for microseismic monitoring. The microseismic monitoring may be used in hydraulic fracturing monitoring, induced seismicity monitoring, CO2 injection monitoring, other injection monitoring, mining, and/or other techniques which cause microseismic events. The system and methodology also may be used to monitor naturally occurring seismic events.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
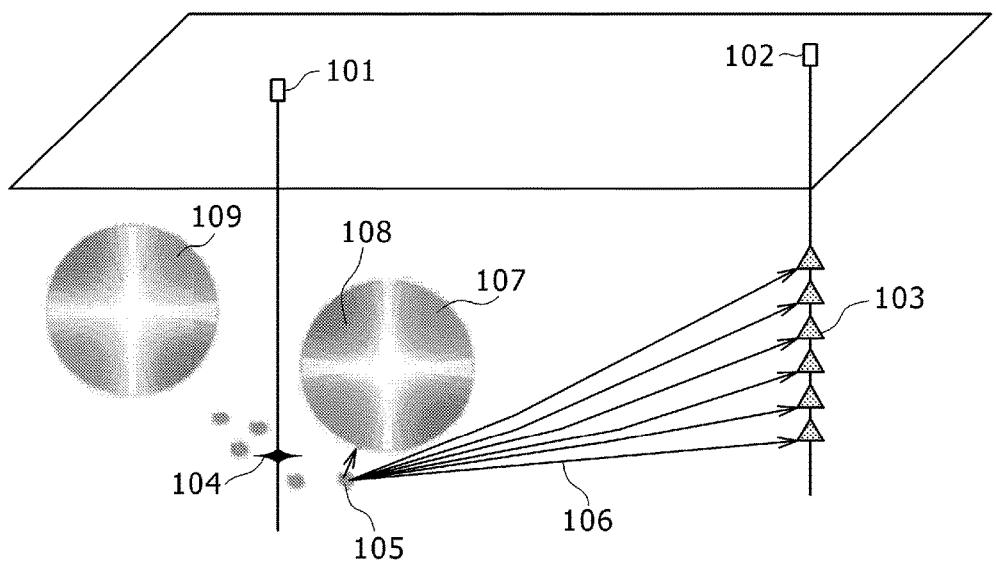
FIG. 1 is a schematic illustration of an example of a monitoring geometry, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Embodiments described herein facilitate enhanced microseismic monitoring in a variety of applications. As described in greater detail below, a system and methodology may be applied to source mechanism identification under, for example, ill-conditioned receiver coverage to enhance the resolvability for microseismic monitoring. The microseismic monitoring may be used in many applications in which microseismic events occur. Examples of such applications include hydraulic fracturing monitoring, induced seismicity monitoring, CO2 injection monitoring, other injection monitoring, mining, and/or other applications causing microseismic events. In some applications, the enhanced microseismic monitoring may be used for evaluating naturally occurring microseismic events.

The various techniques described herein may be utilized to facilitate and improve data acquisition and analysis in downhole tools and systems. In various applications, downhole tools and systems utilize arrays of sensing devices that are configured or designed for easy attachment and detachment in downhole sensor tools or modules that are deployed for purposes of sensing data related to environmental and tool parameters downhole, e.g. within a borehole. The tools and sensing systems, e.g. receiver arrays and data processing systems, disclosed herein may effectively sense and store characteristics related to components of downhole tools as well as formation parameters at various conditions, e.g. elevated temperatures and pressures. The sensing systems herein may be incorporated in tool systems such as wireline logging tools, measurement-while-drilling and logging-while-drilling tools, permanent monitoring systems, drill bits, drill collars, sondes, and other tool systems. For purposes of this disclosure, it should be understood that the description may be applied to many types of these tool systems.

The various techniques described herein may be utilized to facilitate and improve data acquisition and analysis regarding data obtained by the downhole tools and systems. In various applications, the downhole tools and systems utilize seismic receiver arrays deployed for sensing seismic data related to environmental conditions, e.g. the presence of hydrocarbons. The sensing and data processing techniques disclosed herein effectively improve the usefulness of the seismic data.

Embodiments described herein may be applied to source mechanism identification under ill-conditioned receiver coverage to enhance the resolvability for microseismic monitoring. As described above, embodiments of the methodology may be used to enhance microseismic monitoring with respect to hydraulic fracturing monitoring (HFM), induced seismicity monitoring (ISM), CO2 injection, other fluid injection, mining, and/or other activities that create microseismic events. Microseismic source events create seismic wave fields which propagate through the earth, e.g. through isotropic formations, and have wave components including a P-wave component and two shear wave components, Sh and Sv.

Moment tensor inversion (MTI) may be used to identify the source mechanism of the formation deformation caused by various seismic events, e.g. earthquake, micro-earthquake, mining, hydraulic fracturing, injection operations, oil/gas production. To make a successful moment tensor inversion, sufficient sampling of take-off angles from the seismic source should be available to enable good coverage of the seismic receivers (geophones or hydrophones). In a situation in which there is a lack of receiver coverage, which is also called the ill-conditioned inversion problem, the moment tensor parameters can merely be partially solved or the inversion becomes unstable and noise is boosted up dramatically. To make a successful inversion for the complete moment tensor in hydraulic fracturing monitoring (HFM), a surface array or multi-well monitoring can be used. However, most downhole HFM jobs are ill-conditioned for moment tensor inversion due to only having a single well monitoring configuration. Simultaneous multi-event moment tensor inversion (ME-MTI) can improve the receiver coverage and enhance the resolvability of MTI, but the events used for ME-MTI should have a very similar source mechanism. Embodiments described herein provide a method to find the events with similar source mechanisms for the multi-event moment tensor inversion method. Some embodiments described herein provide a method for finding the event groups satisfying desired source mechanism similarity using amplitude ratios between direct P and direct Sh phases and between direct P and direct Sv phases.

Moment tensor inversion can be used to identify the source mechanisms of seismic activities of Earth formation deformation. The formation deformation can result from structural activities such as faulting of the crust and volcanic activities as well as human-induced microseismic events such as seismicity or micro-seismicity caused by hydraulic fracturing, reservoir production, CO2 or water injection, and mining. The source mechanisms of these formation deformation activities can be used to help understand the fracture/fault generation processes and the stress profile of the formation. In the oil and gas industry, for example, understanding the source mechanisms associated with hydraulic fracturing and reservoir production can be useful with respect to post job evaluation, production prediction, and reservoir management. This understanding may be especially helpful with respect to unconventional reserves such as shale gas reserves under which more complicated fracture networks have been observed.

To recover seismic source mechanisms of an induced seismicity, good sampling is utilized with respect to the focal sphere of the seismic source or by ensuring sufficient receiver coverage. Several studies (e.g. Vavryčuk 2007 and Rodriguez, Gu and Sacchi December 2011) pointed out that just five out of six elements of the moment tensor can be inverted from the single well monitoring configuration with a straight wellbore trajectory, including straight vertical and deviated wells. Although it may be possible to invert for the six elements of the moment tensor for a deviated single well, as pointed out by Vavryčuk 2007 and Rodriguez, Gu and Sacchi December 2011, the inversion becomes unstable and noises are boosted up resulting in a high degree of uncertainty.

Most of the hydraulic fracturing monitoring jobs use one monitoring well and this does not meet the minimum desired focal sphere coverage. However, multi-event simultaneous moment tensor inversion can enhance the resolvability by effectively improving the focal sphere coverage under the assumption that the selected multiple events have the same or similar source mechanism. Embodiments described herein facilitate grouping of the events with the same or similar source mechanism for the multi-event moment tensor inversion. Such embodiments effectively extend the plot of P/Sh and P/Sv ratios for a general source mechanism and provide a method to group the microseismic events with the same or similar source mechanism using new P/Sh and P/Sv ratio plots.

A useful aspect of the resolvability of the moment tensor inversion is the sampling coverage of each receiver projected to a focal sphere. The receiver coverage can be improved by using multiple events from different locations. Referring generally to FIG. 1, an example of an ill-conditioned microseismic monitoring geometry is illustrated with one monitoring well. In this example, a treatment well 101 and a monitoring well 102 are illustrated. A plurality of seismic receivers 103 is disposed along the monitoring well 102 for receiving seismic signals.

During a hydraulic fracturing application, a hydraulic fracturing treatment delivers fracturing fluid through perforations 104 of treatment well 101. The hydraulic fracturing treatment generates at least one microseismic source 105 which provides seismic signals 106 to receivers 103. The receivers 103 of monitoring well 102 are projected back to a focal sphere 107 of the microseismic source 105 at locations 108. The locations 108 of the receivers 103 projected back to the focal sphere 107 represent the receiver coverage for moment tensor inversion. For a single seismic event example, the receiver coverage may be poor due to the locations 108 of the receivers 103 being projected back to the focal sphere 107 on a line. In this situation 5 out of 6 elements of the moment tensor can be resolved. However, if multiple events distributed in a comparably large space with the same or very close source mechanisms are considered, the complete moment tensor can be solved by effectively enhancing the receiver coverage as represented by sphere 109.

Figure 2:
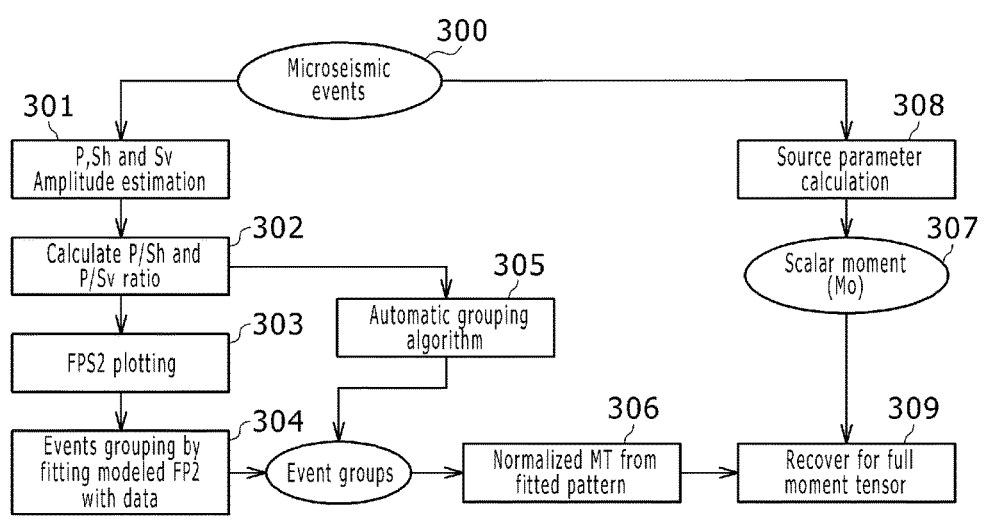
FIG. 2 is a flowchart illustrating an example of a methodology to identify microseismic event groups, according to an embodiment of the disclosure.
Figure 3:
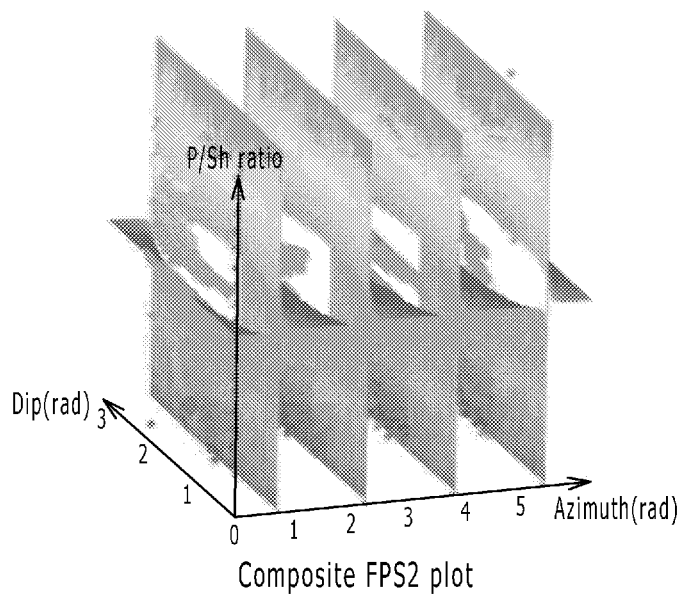
FIG. 3 is a graphical illustration showing an example of a composite fault plane solution (FPS)2 plot, according to an embodiment of the disclosure.

To achieve a multi-event moment tensor inversion, the seismic events with a same or similar source mechanism are identified. Referring generally to FIG. 2, an example of a methodology is provided for identifying the seismic event groups and for solving the source mechanism at the same time. In this example, the input of the workflow is the microseismic event data 300 with the full waveform, event location, arrival time picks for P, Sh and Sv, and the origin time (T0). Amplitudes in a suitable displacement unit for P, Sh and Sv phases for each receiver 103 may be estimated with a normal single event moment tensor inversion to enable outputting the absolute amplitudes for each event as represented by workflow block 301. P/Sh and P/Sv ratios may be calculated based on the amplitudes estimation, as represented by workflow block 302. Additionally, P/Sh and P/Sv ratios may be used for the improved composite FPS (fault plane solution) plot, an example of which is represented in FIG. 3. In this example, the X axis represents the azimuth of the takeoff vector from the seismic source. The Y axis is the dip angle of the takeoff vector from the seismic source, and the Z axis is the P/Sh ratio or P/Sv ratio. Surfaces in the plot are used to show the modeled P/Sh or P/Sv ratio of one source mechanism of a point source represented as the moment tensor. The resulting composite FPS2 plot effectively represents an arbitrary source mechanism with various combinations of the expansion, opening and slipping source components. A user can modify the input parameters of strike, dip, rake, opening angle and/or isotropic (ISO) fraction to adjust the modeled plot.

As represented by workflow block 303 of FIG. 2, the P/Sh or P/Sv ratios from the data calculated in workflow block 302 are plotted as discrete dots in the FPS2 plot illustrated in FIG. 3 and as represented by workflow block 303 of FIG. 2. Event groups can be created either by manually modifying the source mechanism to choose the most fitted events, as represented by workflow block 304, or by running an automated group algorithm to recognize the most fitted patterns in the composite FPS2 plot, as represented by workflow block 305. The normalized moment tensor can be recovered from the input parameters of strike, dip, rake, opening angle, ISO fraction, as represented by workflow block 306. Additionally, a scalar moment 307 may be estimated using source parameter computation algorithms, as represented by workflow block 308. The full moment tensor can be recovered, as represented by workflow block 309, by multiplying the scalar moment 307 with the normalized moment tensor determined at workflow block 306.

With respect to the FPS2 plot, when the source-receiver distance is much larger than the source scale, the seismic source can be considered as a point source and represented by its moment tensor, which is a 3 by 3 matrix. Displacement at the receiver $\vec{x}_r$ with moment tensor source $\hat{M}$ at location $\vec{x}_s$ can be written as:

$$\vec{u}(\vec{x}_r, t: \vec{x}_s) = \sum_{rays} \hat{G}_{ray}(\vec{x}_r, t: \vec{x}_s) : *\hat{M}\frac{\partial M(t)}{\partial t} \quad (1)$$

Where $\hat{G}_{ray}(\vec{x}_r,t:\vec{x}_s)$ is the Green's function for a ray from source $\vec{x}_s$ to receiver $\vec{x}_r$. M(t) is the source function and $\hat{M}$ is the moment tensor of the source. $\hat{G}_{ray}(\vec{x}_r,t:\vec{x}_s)$ can be written as:

$$\hat{G}_{ray}(\vec{x}_r,t:\vec{x}_s) = G_{ray}(\vec{x}_r,t:\vec{x}_s)\hat{g}_r^{ray}\hat{E}_s^{ray} \quad (2)$$

Considering solely the direct arrival and placing equation (2) into equation (1), equation (1) can be rewritten for direct P, Sh and Sv as:

$$\vec{u}^P = G_P(\vec{x}_r,t:\vec{x}_s)\hat{g}_r^P \hat{E}_s^P : *M$$

$$\vec{u}^{Sh} = G_{Sh}(\vec{x}_r,t:\vec{x}_s)\hat{g}_r^{Sh} \hat{E}_s^{Sh} : *M$$

$$\vec{u}^{Sv} = G_{Sv}(\vec{x}_r,t:\vec{x}_s)\hat{g}_r^{Sv} \hat{E}_s^{Sv} : *M \quad (3)$$

The moment tensor of event i can be decomposed via equation (4) below:

$$M^i = M_0^i \left[ ISO \cdot I + (1-|ISO|) \cdot \left( \hat{n}\hat{d}^T + \hat{d}\hat{n}^T \right) \right] \quad (4)$$
$$= M_0^i \hat{M}$$

Where $M_0^i$ is the scalar moment of event i, which varied among the events, ISO is the fraction of the isotropic component, $\hat{n}$ is the unit normal vector of the fault plane, and $\hat{d}$ is the unit displacement vector of the source. ISO may be positive, representing an expansion event, or negative, representing a contraction event. $\hat{M}$ is the common part of the source mechanism for the collective events.

By placing equation (4) into equation (3), multiplying by $\hat{g}_r$, and dividing the scalar Green's function on both side of the equations, the following is produced:

$$u_s^P = G_P^{-1}(\vec{x}_r:\vec{x}_s)\hat{g}_r^P \cdot \vec{u}^P = M_0 \hat{E}_s^P : \hat{M}$$

$$u_s^{Sh} = G_{Sh}^{-1}(\vec{x}_r:\vec{x}_s)\hat{g}_r^{Sh} \cdot \vec{u}^{Sh} = M_0 \hat{E}_s^{Sh} : \hat{M}$$

$$u_s^{Sv} = G_{Sv}^{-1}(\vec{x}_r:\vec{x}_s)\hat{g}_r^{Sv} \cdot \vec{u}^{Sv} = M_0 \hat{E}_s^{Sv} : \hat{M} \quad (5)$$

Thus, the modeled P/Sh ratio and P/Sv ratio at the focal sphere are defined as:

$$R_{P/Sh} = \frac{u_s^P}{u_s^{Sh}} = \frac{E_s^P : \hat{M}}{E_s^{Sh} : \hat{M}} \quad (6)$$

$$R_{P/Sv} = \frac{u_s^P}{u_s^{Sv}} = \frac{E_s^P : \hat{M}}{E_s^{Sv} : \hat{M}}$$

Where $E_s^P$, $E_s^{Sh}$ and $E_s^{Sv}$ are the source second order strain tensor and defined as $E_s = (\hat{g}_s \hat{p}_s^T + \hat{p}_s \hat{g}_s^T)/2$, where $\hat{p}_s$ is the unit phase slowness vector, and where $\hat{g}_s$ is the unit polarization vector for each phase. $\hat{g}_s$ and $\hat{p}_s$ represent the function of the phase takeoff slowness vector defined by the takeoff azimuth ($\varphi$) and dip ($\theta$). Thus, equation (6) defines two surfaces in the ($\varphi$, $\theta$, r) space. Referring again to FIG. 3 an example of the surface of $R_{P/Sh}$ is illustrated. It should be noted that the scalar moment term vanishes in equation (6) which brings an opportunity to equally compare events with different scalar moments.

The measured displacement vector for each event at each receiver 103 can be mapped to the focal sphere:

$$u_s^P = G_P^{-1}(\vec{x}_r:\vec{x}_s)\hat{g}_r^P \cdot \vec{u}^P_{obs}$$

$$u_s^{Sh} = G_{Sh}^{-1}(\vec{x}_r:\vec{x}_s)\hat{g}_r^{Sh} \cdot \vec{u}^{Sh}_{obs}$$

$$u_s^{Sv} = G_{Sv}^{-1}(\vec{x}_r:\vec{x}_s)\hat{g}_r^{Sv} \cdot \vec{u}^{Sv}_{obs} \quad (7)$$

where $\hat{g}_r^P$, $\hat{g}_r^{Sh}$ and $\hat{g}_r^{Sv}$ are the modeled polarization vectors at the receiver and $\vec{u}^P_{obs}$, $\vec{u}^{Sh}_{obs}$ and $\vec{u}^{Sv}_{obs}$ are the measured displacement vectors at the receiver. From equation (7), the P/Sh and P/Sv ratios at the focal sphere are defined for the observed data as follows:

$$R_{P/Sh} = \frac{u_s^P}{u_s^{Sh}} = \frac{G_P^{-1}(\vec{x_r};\vec{x_s})\hat{g}_r^P \cdot \vec{u}_{obs}^P}{G_{Sh}^{-1}(\vec{x_r};\vec{x_s})\hat{g}_r^{Sh} \cdot \vec{u}_{obs}^{Sh}} \quad (8)$$

$$R_{P/Sv} = \frac{u_s^P}{u_s^{Sv}} = \frac{G_P^{-1}(\vec{x_r};\vec{x_s})\hat{g}_r^P \cdot \vec{u}_{obs}^P}{G_{Sv}^{-1}(\vec{x_r};\vec{x_s})\hat{g}_r^{Sv} \cdot \vec{u}_{obs}^{Sv}}$$

An assumption may be made that the P, Sh and Sv direct ray paths are the same. It should be noted that P, Sh and Sv may have different ray paths and thus different takeoff azimuth and dip angles in heterogeneous media, which makes equation (8) not accurate for estimating the amplitude ratio at the focal sphere in this type of media and introduces errors. In homogenous isotropic media, however, equation (8) can be rewritten as:

$$R_{P/Sh} = \frac{u_s^P}{u_s^{Sh}} = \frac{c_p^3 \hat{g}_r^P \cdot \vec{u}_{obs}^P}{c_s^3 \hat{g}_r^{Sh} \cdot \vec{u}_{obs}^{Sh}} \quad (9)$$

$$R_{P/Sv} = \frac{u_s^P}{u_s^{Sv}} = \frac{c_p^3 \hat{g}_r^P \cdot \vec{u}_{obs}^P}{c_s^3 \hat{g}_r^{Sv} \cdot \vec{u}_{obs}^{Sv}}$$

FIG. 3 illustrates an example of the composite FPS2 plot defined by equation (9) and represented by workflow block 303 of FIG. 2. Furthermore, FIG. 3 provides a representation of the relationship between the takeoff vector and the P/Sh or P/Sv ratios. The takeoff vector is the unit group velocity vector from the seismic source to the seismic receiver direction. As mentioned briefly above, the X axis of the plot represents the takeoff azimuth and the Y axis of the plot represents the takeoff deviation (dip). The Z axis is the P/Sh or P/Sv ratio defined by equation (6) and equation (9).

Figure 4:
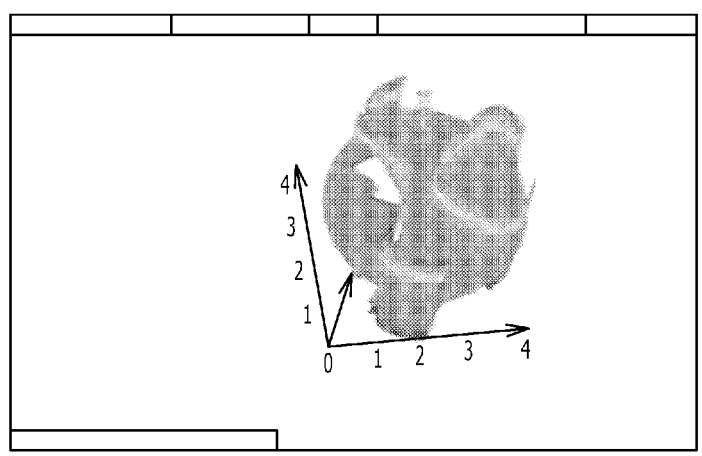
FIG. 4 is a graphical illustration showing an example of an FPS2 plot in cylindrical coordinates, according to an embodiment of the disclosure.
Figure 5:
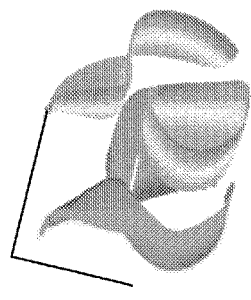
FIG. 5 is a graphical illustration showing an example of a composite FPS2 plot with slip plus opening source mechanisms, according to an embodiment of the disclosure.
Figure 6:
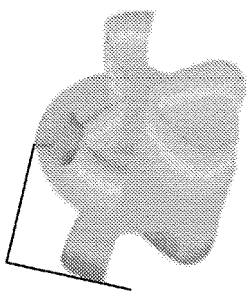
FIG. 6 is a graphical illustration showing an example of a composite FPS2 plot with tilted slipping source mechanisms, according to an embodiment of the disclosure.
Figure 7:
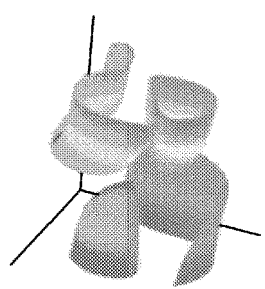
FIG. 7 is a graphical illustration showing an example of a composite FPS2 plot with (−E) plus (+O) plus slip source mechanisms, according to an embodiment of the disclosure.

The composite FPS2 plot also may be plotted with cylindrical coordinates in which the radius direction represents the takeoff deviation angle and the transverse direction represents the takeoff azimuth angle, as illustrated in FIG. 4 which shows the use of equal area projection. FIGS. 5-7 illustrate three examples with different source mechanisms. For example, FIG. 5 illustrates a composite FPS2 plot with slip plus opening source mechanisms; FIG. 6 illustrates a composite FPS2 plot with tilted slipping source mechanisms; and FIG. 7 illustrates a composite FPS2 plot with (−E) plus (+O) plus slip source mechanisms.

If the seismic events have a similar source mechanism (have the same normalized moment tensor), the points defined by equation (9) should match with the surfaces defined by equation (6). Thus a pattern recognition method or manual fitting method can be used to group the seismic events by fitting the data points defined in equation (9) with the surface defined by equation (6).

With respect to interactive group identification, five parameters effectively define the normalized moment tensor as also defined in equation (4). The five parameters include the two angles (azimuth and dip) to define the plane normal $\hat{n}$. The parameters also include another two angles (azimuth and dip) to define the displacement vector $\hat{d}$. The fifth parameter is the isotropic (ISO) fraction. A composite FPS2 plot may be used to provide an interface for the user and to thus facilitate changing of these five parameters to construct a desired moment tensor source. For each determinate source mechanism (normalized moment tensor), a group of events may be identified with respect to events having a fitting function above a threshold set by the user. This methodology may be applied at workflow block 304 illustrated in FIG. 2.

The fitting function can be a desired function defined to estimate or measure the distance from the observed data point to the surface defined in equation (6) with an input normalized moment tensor in ($\varphi$, $\theta$, r) space. An example of a fitting function is defined as equation (10):

$$F_i = \frac{\sum_{j=1}^{R_i} H\left(e^{\frac{-f^2(mt)_i^j}{|\nabla f(mt)_i^j|^2}} - \delta\right)}{R_i} \quad (10)$$

Where $F_i$ is the fitting function defined for event i, $R_i$ is the number of the measurements (obtained by the receivers) for event i, $\delta$ is the threshold set by the user, $f(mt)_i^j$ is the residual function of the P/Sh or P/Sv ratio between the modeled data and data on measurement (obtained by the receivers) j which is defined in equation (11) below, $\nabla f(mt)_i^j$ is the gradient of the residual function $f(mt)$, and H(x) is the step function. The threshold of $F_i$ may be the input from the user, and the events with $F_i$ larger than this threshold may be selected into the seismic event group defined by the normalized moment tensor mt.

$$f = U_P^M U_S^D - \frac{U_P^D U_P^M}{|U_P^D U_P^M|} U_P^D U_S^M \quad (11)$$

In equation (11): $U_P^M$, $U_S^M$, $U_P^D$ and $U_S^D$ are the modeled P, S amplitude and observed P and S amplitude. S represents either Sh or Sv wave. The term $$\frac{U_P^D U_P^M}{|U_P^D U_P^M|}$$

is used to identify the matching of the sign of the modeled and observed data. If the sign of the modeled data is not matching with the sign of the observed data, the residual will have a larger value which causes the fitting function to provide a small value. This mechanism is used to prevent the event selection algorithm from picking the wrong event with the opposite polarity.

Various interactive features may be used to facilitate adjustment of the methodology by a user. For example, slide bars or other adjustable features may be provided on a graphical user interface or other type of interactive interface. In this example, the slide bars enable a user to adjust the source mechanism to change the modeled plot interactively. Events with the amplitude ratios (P/Sh and P/Sv) fitting with the modeled plot may be highlighted and selected to generate the event groups. Operations such as merging or splitting the event groups may be defined to facilitate quality control by ensuring events in the same group have the similar source mechanism.

Figure 8:
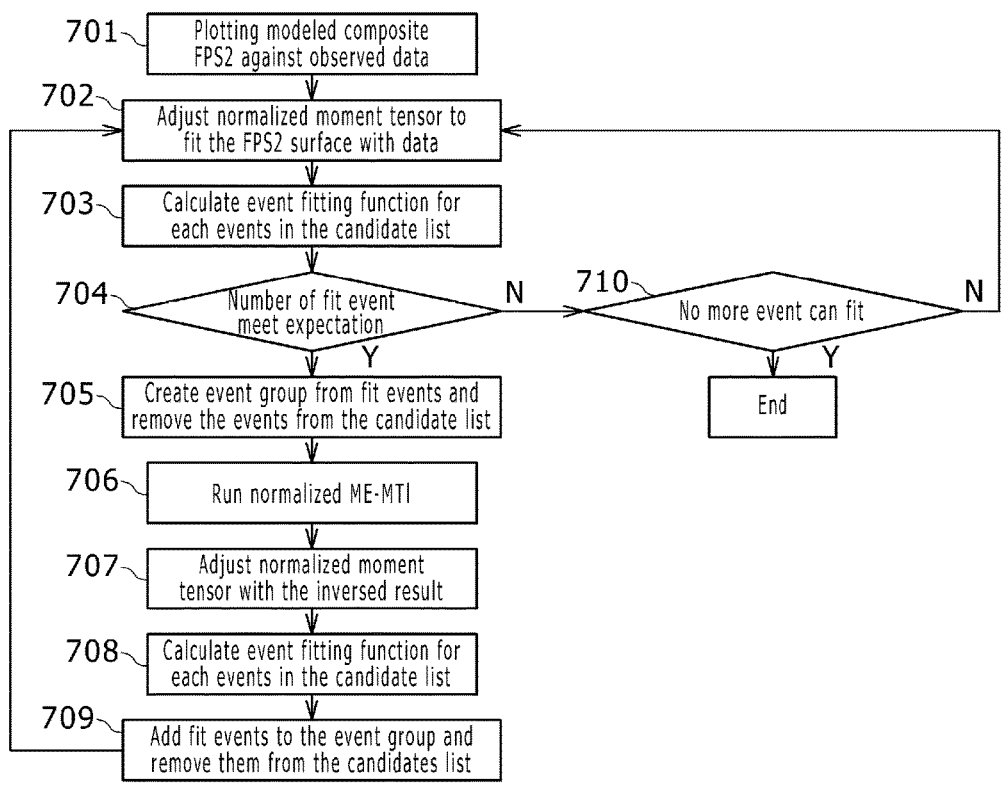
FIG. 8 is a flowchart illustrating an example of a methodology for interactive seismic event group identification, according to an embodiment of the disclosure.

Referring generally to FIG. 8, an example of a detailed workflow is provided with respect to interactive event group identification. In this example, the modeled P/Sh or P/Sv ratios defined by equation (6) are plotted against the observed data defined by equation (9), as represented by workflow block 701. A user can adjust the 5 parameters which define the normalized moment tensor, thus changing the source mechanism (Normalized moment tensor) to fit the trend of the modeled ratio to the trend of the observed data points in the FPS2 plot as represented by workflow block 702. A fitting function may then be calculated, as represented by workflow block 703, for each event in the candidate pool.

The events with the fitting function larger than a threshold amount will be selected, as represented by workflow decision block 704. Information regarding the number and list of the events selected by the fitting function may be displayed to the user. If the number of the selected events meets expectations, an event group can be created for the selected events as represented by workflow block 705. The selected group of events may then be removed from the candidate pool.

A normalized ME-MTI algorithm may be run for the event group, as illustrated by workflow block 706. For example, the ME-MTI algorithm may be run to calculate a centroid normalized moment tensor for the group. As illustrated by workflow block 707, the calculated moment tensor result may be set in the composite FPS2 plot to update the modeled P/Sh or P/Sv ratio. Subsequently, the event fitting function may be recalculated for the remaining events, as represented by workflow block 708. Then, as represented by workflow block 709, the events with the fitting function exceeding the threshold are added to this event group. The process represented by workflow blocks 706 through 709 provides the methodology for adding events which have the same or very close source mechanism with the current event group not selected during manual fitting. Subsequently, the workflow is continued for the remaining events from the workflow block 702. The loop may be repeated until there are no more events that can fit within the modeled ratio, as represented by workflow block 710.

Figure 9:
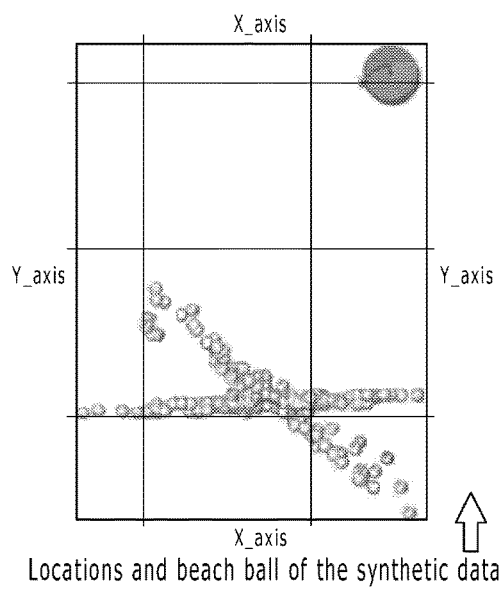
FIG. 9 is a graphical illustration showing an example of synthetic data providing locations and a "beach ball" grouping, according to an embodiment of the disclosure.
Figure 10:
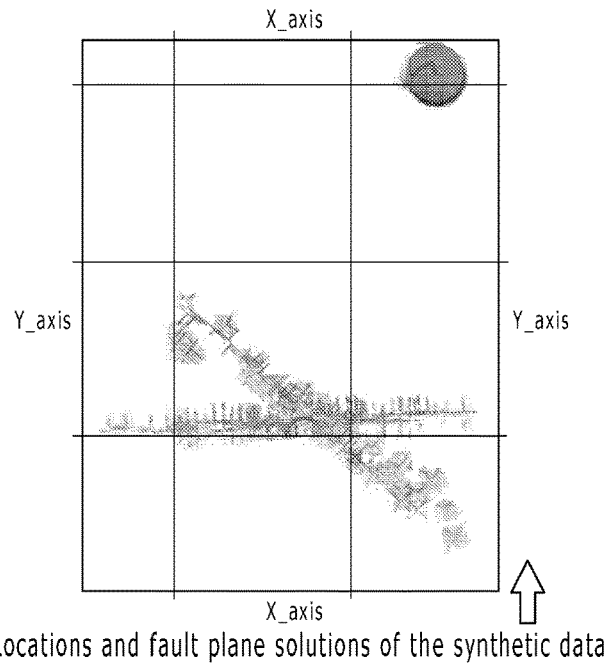
FIG. 10 is a graphical illustration showing an example of synthetic data providing locations and fault plane solutions, according to an embodiment of the disclosure.
Figure 11:
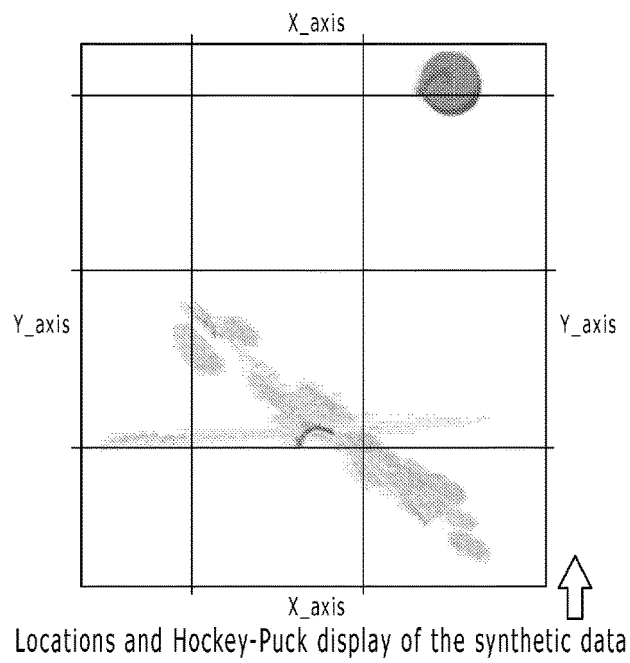
FIG. 11 is a graphical illustration showing an example of synthetic data providing locations and a "hockey-puck" grouping, according to an embodiment of the disclosure.

Synthetic data may be used to verify the methodology described above. In a specific example, 247 synthetic events were generated with three main source mechanisms as illustrated in FIGS. 9-11. In this example, FIG. 9 provides a graphical illustration showing synthetic data providing locations and a "beach ball" grouping; FIG. 10 provides a graphical illustration showing synthetic data providing locations and fault plane solutions; and FIG. 11 provides a graphical illustration showing synthetic data providing locations and a "hockey-puck" display.

Additionally, the source parameters of the three event groups are shown in Table 1 below:

TABLE 1

Main source mechanisms of the synthetic data

| | Strike (deg) | Dip (deg) | Rake (deg) | Open angle (deg) | [V] | Event number |
|---|---|---|---|---|---|---|
| Group 1 | 90 ± 3 | 90 ± 3 | 0 ± 3 | 0 ± 3 | 0 | 141 |
| Group 2 | 130 ± 3 | 90 ± 3 | 0 ± 3 | 0 ± 3 | 0 | 49 |
| Group 3 | −50 ± 3 | 45 ± 3 | 0 ± 3 | 0 ± 3 | 0 | 57 |

Furthermore, the results from the workflow are shown in Table 2 below:

TABLE 2

Main source mechanisms of the synthetic data

| | Strike (deg) | Dip (deg) | Rake (deg) | Open angle (deg) | [V] | Event number |
|---|---|---|---|---|---|---|
| Group 1 | 86.7 | 89.95 | 0.6 | −0.631 | 0 | 137 |
| Group 2 | 132.5 | 89.68 | −1.17 | −0.46 | 0 | 48 |
| Group 3 | −56.1 | 47.3 | 0 ± 3 | −0.87 | 0 | 56 |

The three event groups in this example are recovered by running the workflow, and the estimated source mechanisms are very close to the synthetic data. Most of the events are categorized into the right event group except 6 events which cannot be categorized into the groups using the workflow due to the threshold setting.

The threshold δ controls the similarities of the events that can be grouped into one group. In the test case, although the events are roughly categorized into three main groups, the source mechanisms of the events in the three groups are slightly different as demonstrated by Table 1. Another factor to contribute to the variations is the uncertainties in the amplitude estimation. The variation of the source mechanisms in the synthetic data and the amplitude information estimated at each receiver dictates that the threshold is sufficiently large to tolerate the variations. However, it also should be small enough to keep the variation of the source mechanisms in the event groups within an acceptable range. The optimization of the threshold setting depends on factors such as the noise level, source mechanism variations, and the uncertainty of the amplitude estimation.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for enhancing seismic monitoring, comprising:
    receiving a seismic waveform during a hydraulic fracturing operation wherein the seismic waveform is produced by the hydraulic fracturing operation;
    determining an amplitude ratio between a direct P phase and a direct Sh phase of the seismic waveform;
    further determining an amplitude ratio between a direct P phase and a direct Sv phase of the seismic waveform; and
    finding seismic event groups satisfying a predetermined seismic source mechanism similarity threshold using the amplitude ratios between the direct P and Sh phases and the direct P and Sv phases, wherein finding comprises using the ratios to establish a composite fault plane solution (FPS2) plot and outputting the composite fault plane solution plot in tangible form.

2. The method as recited in claim 1, wherein finding comprises using moment tensor inversion to identify seismic source mechanisms.

3. The method as recited in claim 1, wherein establishing the composite FPS2 plot comprises representing an arbitrary source mechanism with a desired combination of expansion, opening, and slipping source components to establish a modeled plot.

4. The method as recited in claim 3, further comprising adjusting the modeled plot by modifying an input parameter.

5. The method as recited in claim 4, wherein modifying the input parameter comprises modifying at least one of a strike, dip, rake, opening angle, or isotropic (ISO) fraction parameter.

6. The method as recited in claim 5, further comprising recovering a normalized moment tensor and a full moment tensor to find the seismic event groups satisfying the predetermined seismic source mechanism similarity threshold.

7. The method as recited in claim 1, wherein finding comprises creating seismic event groups by manually modifying at least one source mechanism.

8. The method as recited in claim 1, wherein finding comprises creating seismic event groups by running an automated group algorithm.

9. The method of claim 1 wherein outputting comprises outputting the composite fault plane solution plot to a display.

10. A method, comprising:
receiving seismic waveforms via an array of seismic receivers deployed in a monitoring well during a hydraulic fracturing operation wherein the seismic waveforms are produced by the hydraulic fracturing operation;
for the seismic waveforms, estimating waveform amplitudes for P, Sh and Sv phases for each seismic receiver of the array;
calculating at least one of P/Sh and P/Sv ratios based on the estimated waveform amplitudes;
using at least one of the P/Sh and P/Sv ratios to establish a composite fault plane solution plot and outputting the composite fault plane solution plot in tangible form;
determining fitted patterns in the composite fault plane solution plot to establish seismic event groups; and
recovering a normalized moment tensor and a full moment tensor to find the seismic event groups satisfying a predetermined seismic source mechanism similarity threshold.

11. The method as recited in claim 10, further comprising using the array of seismic receivers in reservoir production monitoring.

12. The method as recited in claim 10, further comprising using the array of seismic receivers in CO2 injection monitoring.

13. The method as recited in claim 10, further comprising using the array of seismic receivers in water injection monitoring.

14. The method as recited in claim 10, wherein determining comprises manually modifying at least one seismic source mechanism.

15. The method as recited in claim 10, wherein determining comprises running an automated group algorithm.

16. The method as recited in claim 10, wherein recovering the full moment tensor comprises multiplying the normalized moment tensor by a scalar moment.

17. The method of claim 10 wherein outputting comprises outputting the composite fault plane solution plot to a display.

18. A method, comprising:
under ill-conditioned seismic receiver coverage, receiving seismic waveforms during a hydraulic fracturing operation wherein the seismic waveforms are produced by the hydraulic fracturing operation;
identifying seismic source mechanisms under the ill-conditioned seismic receiver coverage; and
using the seismic source mechanisms to enhance resolvability for microseismic monitoring by finding seismic event groups which satisfy a seismic source similarity threshold, wherein finding seismic event groups comprises using P/Sh and/or P/Sv waveform amplitude ratios to establish one or more composite fault plane solution plots and outputting the one or more composite fault plane solution plots in tangible form.

19. The method of claim 18 wherein outputting comprises outputting the one or more composite fault plane solution plots to a display.

* * * * *